United States Patent Office 3,573,299
Patented Mar. 30, 1971

3,573,299
DERIVATIVES OF 2,6-DODECADIENOIC ACID
David Andrews, Nutley, Walter Kimel, Highland Park, and Ronald Propper, Fair Lawn, N.J., assignors to Hoffmann-La Roche Inc., Nutley, N.J.
No Drawing. Original application Dec. 18, 1967, Ser. No. 691,246, now Patent No. 3,513,176, dated May 19, 1970. Divided and this application Sept. 26, 1969, Ser. No. 861,503
Int. Cl. C07d 1/12
U.S. Cl. 260—247.7
2 Claims

ABSTRACT OF THE DISCLOSURE

This invention is directed to a process for producing 3-ethyl - 10,11 - epoxy-2,6-dodecadienoic acid derivatives which are useful in killing and preventing proliferation of insects by upsetting their hormone balance from 3,7-di-lower alkyl-1,6-octadien-3-ols and intermediates therein.

CROSS REFERENCE TO RELATED APPLICATIONS

This application is a divisional application of Ser. No. 691,246, filed Dec. 18, 1967 and now U.S. Pat. No. 3,513,176, issued May 19, 1970.

BACKGROUND OF THE INVENTION

The activity of the methyl esters of 10,11-epoxy-3,11-dimethyl-7-ethyl-2,6-tridecadienoic and 10,11-epoxy-3,7,11-trimethyl-2,6-dodecadienoic acid for upsetting the hormone balance of insects to prevent them from growing and reproducing is well known. Furthermore, the use of these compounds as insecticides has stirred great interest since while these compounds are effective in killing insects by upsetting their hormone balance, these compounds are considered harmless to animals that are of a higher order than insects.

These two compounds can be synthetically prepared either by a long complicated synthesis or from farnesol which is a $C_{15}$ alcohol containing three olefinic double bonds. In the process of preparing the methyl ester of 10,11 - epoxy - 3,7,11-trimethyl-2,6-dodecadienoic acid, farnesol is first oxidized to farnesal which is then further oxidized to farnesenic acid. The farnesenic acid is then esterified to give the methyl ester which is epoxidized at the terminal double bond to give the final product. It has been found that by epoxidizing the methyl ester of farnesenic acid a mixture of products is formed. This occurs since epoxy groups form at all of the olefinic positions in the molecule and not only at the desired terminal olefinic position. Therefore, the yield of the desired 10,11-epoxy compound which has the insecticide activity is very low when produced by this process. Furthermore, workers in the field have found that the separation of the desired 10,11-epoxy compound from the various epoxy isomers produced by this process is very difficult, requiring expensive equipment and handling techniques.

SUMMARY OF THE INVENTION

In accordance with this invention, we have discovered that when a 3-substituted-1,6-octadiene compound of the formula:

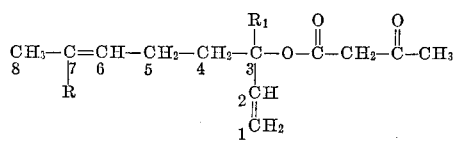

(I)

wherein R and $R_1$ are lower alkyl is treated with an epoxidizing agent, epoxidation takes place only at the double bond in the 6-position without affecting the double bond in the 1-position so as to produce a compound of the formula:

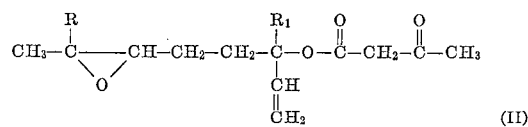

(II)

wherein R and $R_1$ are as above.

It has been found that the conversion of compounds of the Formula I above to compounds of the Formula II above is carried out without undue formation of other epoxy isomers. In accordance with this invention, it has been found that compounds of the Formula II above can be converted into insecticides of the formula:

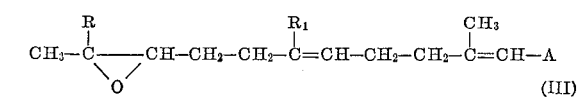

(III)

wherein R and $R_1$ are as above; A is selected from the group consisting of

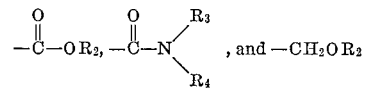

$R_2$ is selected from the group consisting of hydrogen, lower alkyl, phenyl and dilower alkyl amino lower alkyl; and $R_3$ and $R_4$ are lower alkyl and taken together with the nitrogen atom a mono heterocyclic ring selected from the group consisting of 5-membered rings and 6-membered rings and containing at the most, one further hetero atom selected from the group consisting of nitrogen, oxygen and sulfur.

Therefore this invention provides a simple and economic means for producing in high yields insecticides which upset the hormone balance of insects so as to control their growth and reproduction while being harmless to animals of a higher form than insects. Furthermore, the process of this invention eliminates the necessity for separating various epoxy isomers.

The process of this invention produces known compounds such as 10,11-epoxy-3,11-dimethyl-7-ethyl-2,6-tridecadienoic acid methyl ester and 10,11-epoxy-3,7,11-trimethyl-2,6-dodecadienoic acid methyl ester. These known compounds upset the hormone balance of insects such as yellow mealworm (Tenebrio molitor) and the American cockroach (Periplaneta americana) to prevent them from growing and reproducing.

DETAILED DESCRIPTION OF THE INVENTION

The numbering of the octadiene chain is shown in Formula I above for the purposes of convenience.

As used throughout the application, the term "lower alkyl" comprehends both straight and branched chain saturated hydrocarbon groups containing from 1 to 6 carbon atoms such as methyl, ethyl, propyl, isopropyl, etc.

In accordance with this invention when $R_2$ in compounds of the Formulae III and III–A is di-lower alkyl-amino-lower alkyl, the preferred di-lower alkylamino-lower alkyl radicals are dimethylaminomethyl, diethyl-aminoethyl, dimethylaminoethyl, and dimethylamino-propyl. When in compounds of the Formulae III and III–A $R_3$ and $R_4$ are taken together with the nitrogen atom to form a 5- or 6-membered heterocyclic ring having, at the most, one further hetero atom selected from the group consisting of sulfur, oxygen, and nitrogen, the preferred heterocyclic rings are piperazinyl, pyrrolidinyl, morpholinyl, piperidinyl and thioazolidine.

In accordance with this invention, the insecticides of the Formula III are prepared from the compounds of the Formula I by means of the following reaction scheme:

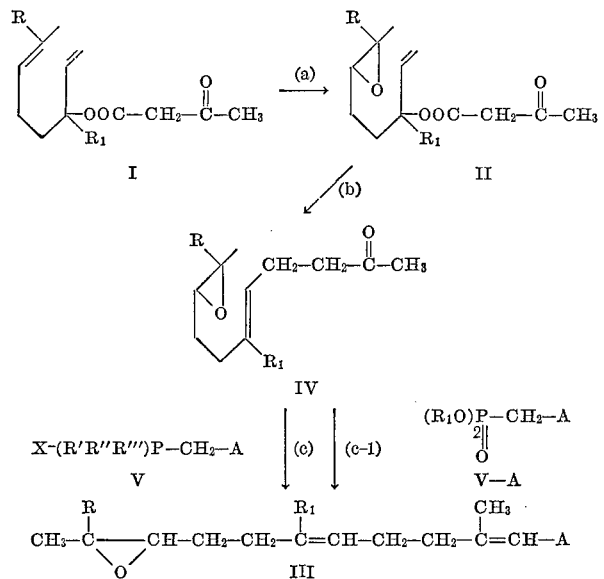

wherein R, $R_1$ and A are as above; R′, R″ and R‴ are each aryl containing from 6 to 20 carbon atoms such as phenyl, tolyl, xylyl, mesityl, naphthyl, anthryl, biphenyl, azulyl or aralkyl containing from 7 to 20 carbon atoms such as benzyl or an alkyl group containing from 1 to 20 carbon atoms, e.g., methyl, ethyl, hexyl, octyl, decyl, etc., and X is the anion of a mineral acid, e.g., $Cl^{(-)}$, $Br^{(-)}$, $I^{(-)}$, $HSO_4^{(-)}$;

The conversion of compounds of the Formula I above, to compounds of the Formula II above, is carried out by any conventional epoxidation technique such as treating the compound of Formula I above with an epoxidizing agent. Any conventional epoxidizing agent can be utilized in carrying out step (a) in accordance with this invention. Among the preferred epoxidizing agents are the per acids such as peracetic acid, perphthalic acid, etc., or hydrogen peroxide. Generally, it is preferred to carry out this reaction at a temperature of from about 0° C. to about 60° C. though lower temperatures can also be utilized. The reaction of step (a) can be conveniently carried out in water. However, generally it is preferred that this reaction be carried out in an inert organic solvent. Any conventional inert organic solvent can be utilized. Among the inert organic solvents which can be utilized are included toluene, benzene, hexane, diethyl ether, chloroform, methylene chloride, etc.

The epoxidation of a compound of the Formula I above proceeds by the formation of an epoxy group at the olefinic double bond at the 6-position without effecting the double bond at the 1-position. Therefore, it has been found that epoxidation of the compound of Formula I produces a 6,7-epoxy compound without any formation of the 1,2-epoxy compound. Hence, the conversion of compounds of the Formula I into compounds of the Formula II by epoxidation is carried out with high yields and without the necessity of separating out isomers of the compound of Formula II above.

The conversion of compounds of the Formula II above to compounds of the Formula IV above, as in step (b) is carried out by heating compounds of the Formula II above to a temperature of 120° C. to about 220° C. The reaction of step (b) is carried out by heating the reactants alone or in the presence of an inert organic solvent such as the solvents hereinbefore mentioned. If a solvent is utilized, it is preferred to carry out this reaction in the presence of high boiling inert organic solvents, since if the low boiling solvents are utilized, pressure must be applied in order to carry out this reaction. In carrying out the reaction of step (b) temperatures of greater than 220° C. can be utilized, if desired. However, it has been found that no additional advantage is incurred by utilizing temperatures of greater than 220° C. Therefore, temperatures above 220° C. are seldom utilized in carrying out this reaction step. When compounds of Formula II are heated to a temperature of at least 120° C., decarboxylation and rearrangement of the compound of Formula II occurs so that compounds of Formula IV above are produced in high yields.

The reaction of (b) can, if desired, be carried out in the presence of an aluminum tri-(lower alkoxide) catalyst. Any of the conventional aluminum tri-(lower alkoxide) catalysts such as aluminum tri-(isopropoxide), aluminum trimethoxide can be utilized in this reaction.

The conversion of compounds of the Formula IV above into compounds of the Formula III above can be carried out as in step (c) by reacting compounds of the Formula IV above with a compound of the Formula V via a Wittig reaction. This reaction is preferably carried out in the presence of a solvent, i.e., an organic solvent substantially inert to the reactants, such as a lower alkanol, i.e., methanol, ethanol, etc., dimethylformamide, acetonitrile, or benzene. The preferred solvents are methanol and benzene. The reaction is conducted in the presence of a strong base such as an alkali metal hydride, e.g., sodium hydride, potassium hydride, an alkali metal amide, e.g., sodium amide, alkali metal lower alkoxide, preferably sodium methoxide, or a solution of an alkali metal hydroxide in a lower alkanol, e.g., KOH in methanol or ethanol an aryl or alkyl Group I–A metallo organic compound wherein lithium, sodium, potassium, rubidium, caesium and francium are the intended metallo moieties, and wherein the preferred alkyl moieties are the lower alkyl groups and the preferred aryl moieties are phenyl and lower alkyl-substituted phenyl groups, with phenyl lithium and butyl lithium being preferred metallo organics. In carrying out the Wittig reaction, temperature and pressure are not critical, and this reaction can be carried out at room temperature or at elevated temperatures. On the other hand, temperatures as low as 0° C. can be utilized.

In forming the compound of Formula V above, a compound of the formula:

$$X—CH_2—A \qquad (VI)$$

wherein X is a halogen and A is as above is reacted with a phosphine of the formula:

$$R'R''R'''P \qquad (VI–A)$$

wherein R′, R″ and R‴ are as above.

Among the preferred phosphines of the Formula VI–A are included triphenyl phosphine, trimethyl phosphine. This reaction to form the compound of Formula V is carried out in the presence of a solvent such as any of the aforementioned inert solvents. In carrying out this reaction to form the compound of Formula V above temperature and pressure are not critical, and temperatures of 0° C. to 150° C. or higher can be utilized.

Compounds of Formula IV above can be converted into compounds of Formula III above by reaction, as in step (c–1) with compounds of the Formula V–A above, via a Horner reaction. In carrying out the reaction of step (c–1), temperatures of 0° C. to 70° C. can be utilized. Generally, it is preferred to carry out this reaction at room temperature and atmospheric pressure. However, elevated temperatures and pressure can be utilized if desired. Furthermore, this reaction is carried out in an inert organic solvent medium in the presence of a base. Any conventional inert organic solvent can be utilized such as benzene, toluene, dimethyl formamide, diethyl ether, etc. Any of the bases hereinbefore mentioned in connection with reaction (c) can be utilized.

The compound of Formula V–A is prepared by reacting the compound of Formula VI with a compound of the formula:

$$P(OR_1)_3 \qquad (VI-B)$$

wherein $R_1$ is as above.

This reaction is carried out at temperatures of from 100° C. to 150° C. Furthermore, the formation of the compound VI–B can be carried out utilizing any solvent. On the other hand, if desired, this reaction can be carried out in the presence of any conventional high boiling solvent such as Decalin, tetralin, etc.

In accordance with this invention, it has been found that compounds of the Formula IV possess valuable perfumistic properties which make them useful as odorants in the compounding of perfumes and other scented compositions.

The compound of Formula I is prepared from a tertiary alcohol of the formula:

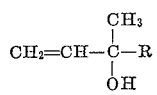

VII wherein R is as above.

by the following reaction scheme:

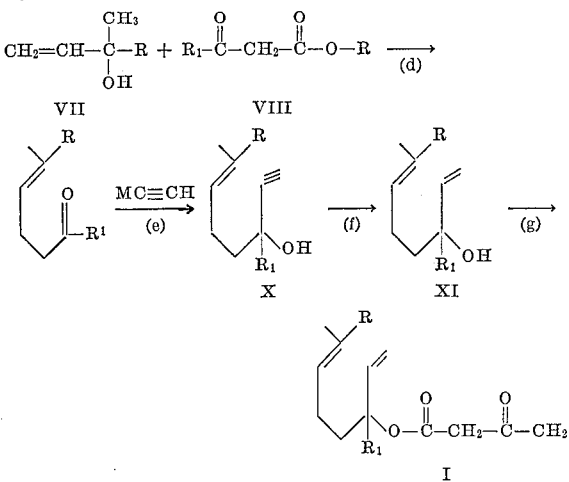

wherein R and $R_1$ are as above and M is an alkali metal such as sodium, potassium or lithium.

The reaction of compounds of Formula VII with compounds of Formula VIII to form compounds of Formula IX is carried out, in accordance with step (d), by heating a mixture composed of the compounds of Formula VII and compounds of Formula VIII in the presence of aluminum tri-(lower alkoxide). The reaction of step (d) is effected by adding catalytic amounts of an aluminum tri-(lower alkoxide) to the mixture and heating the mixture, preferably with sufficient stirring, to a temperature sufficiently high to cause a steady evolution of carbon dioxide and the lower alkyl alcohol which is formed during the reaction. The completion of the reaction is indicated by the cessation of the evolution of carbon dioxide and the alcohol. In carrying out this reaction, temperatures from 120–220° C. are utilized with 170–200° C. being the preferred range. This reaction can be carried out in the presence of an inert organic solvent, preferably a solvent which has a boiling point of over 100° C. Solvents which may be used include high boiling hydrocarbons or hydrocarbon fractions, e.g., Decalin, tetralin, mineral oil, petroleum ether, high boiling inert ethers, e.g., di-phenyl ether, etc. On the other hand, the reaction can take place without utilizing any solvent. Aluminum tri-(lower alkoxides) which are used as catalysts in this reaction include, for example, aluminum tri-(methoxide), aluminum tri-(ethoxide), aluminum tri-(isopropoxide), aluminum tri-(n-butoxide), aluminum tri-(n-pentoxide), aluminum tri-(n-heptoxide), etc. It is preferred, however, to use an aluminum tri-(lower alkoxide) wherein the alkoxide radical contains from 2 to 4 carbon atoms, such as aluminum tri-(isopropoxide).

In carrying out the reaction of step (d) usually one mole of the compound of Formula VII above is reacted with one mole of the compound of Formula VIII above. However, if desired, the reaction of step (d) can be carried out with a molar excess of either the compound of Formula VII above or the compound of Formula VIII above.

The conversion of compounds of Formula IX above to compounds of the Formula X above, as in step (e), is carried out by treating compounds of Formula IX above with an alkali metal acetylide. Generally, it is preferred to carry out this reaction in an inert organic or inorganic solvent, such as liquid ammonia, toluene, di-ethyl ether, etc. Any liquid solvent which is inert to the reactants can be utilized in carrying out this reaction. Furthermore, in carrying out this reaction, temperatures of from −50° C. to 50° C. can be utilized with temperatures of from −30° C. to room temperature being preferred.

Compounds of Formula X are converted into compounds of Formula XI, as in step (f) by hydrogenating compounds of the Formula X in the presence of a palladium catalyst poisoned with lead [see, e.g., H. Lindlar, Helv. Chim. Acta, 35, (1952)].

In accordance with this invention octadienes of the formula:

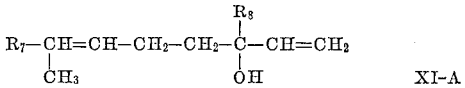

XI–A wherein $R_7$ is a lower alkyl radical containing from 1 to 6 carbon atoms and $R_8$ is a lower alkyl radical with the proviso that when $R_7$ contains from 1 to 4 carbon atoms, $R_8$ contains at least two carbon atoms can be prepared from the tertiary alcohols of Formula VII. The compounds of Formula XI–A, because of their fine fragrance, are extremely useful as odorants in the preparation of perfumes and in the preparation of other scented compositions.

The compounds of Formula XI above are converted to the compounds of Formula I above by treating the compound of Formula XI above with diketene or an aceto-acetic acid ester. In treating the compound of Formula XI with diketene, an alkaline catalyst is utilized. Any conventional alkaline catalyst can be utilized in carrying out this reaction. Typical catalysts which can be utilized in carrying out this reaction include sodium alkoxides, such as sodium methoxide, sodium isopropoxide and sodium ethoxide; tertiary amines, such as pyridine, triethylamine, etc.; alkali metal hydroxides, such as sodium hydroxide and potassium hydroxide. In carrying out the reaction with diketene, no solvent need be present. However, if desired, any conventional inert organic solvent can be utilized in carrying out this reaction. Typical inert organic solvents which can be utilized include benzene, toluene, petroleum ether, etc. In carrying out the reaction of the compounds of Formula XI above with diketene to produce a compound of the Formula I above, temperatures and pressures are not critical. However, temperatures from 0–40° C., preferably room temperature, are generally employed in carrying out this reaction.

In treating the compounds of the Formula XI above with an aceto-acetic acid ester to produce a compound of the Formula I above, any conventional acid or alkaline catalyst can be utilized. This reaction can be carried out with or without an inert organic solvent. If an inert organic solvent is utilized any of the conventional inert organic solvents hereinbefore mentioned can be utilized. In carrying out the reaction of an aceto-acetic acid ester with the compound of Formula XI above, temperature and pressure are not critical and this reaction can be carried at room temperature and atmospheric pressure. However, care must be taken to prevent the temperature during this reaction from going over 90° C. since cracking of the compound of Formula I above will occur. Generally, it is preferred to utilize a temperature of from 0° C. to 90° C. during this reaction. This reaction is carried out by the distillation of the alcohol that is formed during this reaction. If a high boiling alcohol is formed, the reaction is carried out under vacuum so that the distillation of the alcohol proceeds below a temperature of 90° C.

If the compound of Formula XI–A is treated as in step (g), new and novel aceto-acetate compounds are obtained having the formula

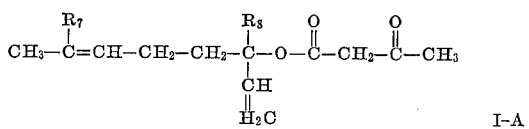

I-A wherein $R_7$ is a lower alkyl radical containing from 1 to 6 carbon atoms and $R_8$ is a lower alkyl radical with the proviso that when $R_7$ contains from 1 to 4 carbon atoms, $R_8$ contains at least two carbon atoms.

The end products of Formula III can exist in eight different geometric stereo-isomeric forms, each geometric isomeric form having two optical antipodes. This invention includes compounds of Formula III above having each of the possible geometric and optical configurations as well as mixtures, including racemates, thereof.

The process of this invention, can, if desired, be utilized to prepare the compound of Formula III in any of its various geometric isomeric forms. For instance, in the reaction of step (d) the compound of Formula IX is produced in two different geometric isomeric forms, which if desired, can be separated by any conventional method such as fractional distillation or vapor phase chromatography.

Also, the reaction of step (b) produces from a pure geometric isomeric form of compound II the compound of Formula IV in two different geometric isomeric forms. These geometric isomers can also be separated by conventional means such as fractional distillation or vapor phase chromatography. Furthermore, with respect to the reaction of step (c) or (c–1) the compound of the Formula III is produced from a pure geometric isomeric form of compound IV by these reactions in two geometric isomeric forms. These two geometric isomeric forms can be separated by any conventional means such as those hereinbefore mentioned.

The following examples are illustrative but not limitative of this invention.

Example 1.—Preparation of 6-methyl-5-octen-2-one

A three liter flask was fitted with a stirrer, thermometer, 18 inch column packed with saddles, receiver, and a tube from the receiver leading to a Dry Ice trap and gas meter. The flask was charged with 200.2 gms. of 3-methyl-1-penten-3-ol, 520.6 gms. of ethyl acetoacetate and 2 gms. of aluminum isopropoxide. The reaction mixture was heated and when the temperature reached 130° C., the gas meter was connected. The reaction was then maintained at a pot temperature of 175–190° C. whereupon ethanol distilled from the reaction and carbon dioxide was evolved. When evolution of carbon dioxide ceased, the reaction mixture was cooled and then distilled at 4/1 reflux ratio to give 6-methyl-5-octen-2-one ($n_D^{25}=1.4410$).

Example 2.—Preparation of 3,7-dimethyl-6-nonen-1-yn-3-ol 27.6 gms. of sodium metal were dissolved in 420 cc. of liquid ammonia. Acetylene gas was then bubbled in after passing through a Dry Ice trap. When the blue color was discharged, the rate of addition of acetylene was slowed and a soltuion of 140.2 gms. of 6-methyl-5-octen-2-one in 140 cc. of diethyl ether was added over a period of one hour. Acetylene was bubbled into the reaction mixture for two hours more. After stirring overnight, the ammonia was allowed to evaporate while being replaced with ether. When virtually all the ammonia was gone, the reaction mixture was poured into dilute sulfuric acid and ice. The ether layer was separated, washed with water and sodium bicarbonate solution and dried over sodium sulfate. After filtration and evaporation of the ether in vacuo, the residue was distilled through an 8 inch Vigreaux column to give 3,7-dimethyl-6-nonen-1-yn-3-ol ($n_D^{25}=1.4621$).

Example 3.—Preparation of 3,7-dimethyl-1,6-nonadien-3-ol 135 gms. of 3,7-dimethyl-6-nonen-1-yn-3-ol, 270 cc. of hexane and 6.7 gms. of Lindlar catalyst were stirred under an atmosphere of hydrogen in a one liter flask at atmospheric pressure. When 96% of the theoretical volume of hydrogen had been consumed, the uptake ceased. After filtration and evaporation of solvent, the product was distilled through an 8 inch Vigreaux column to give 3,7-dimethyl-1,6-nonadien-3-ol.

Example 4.—Preparation of 3,7-dimethyl-1,6-nonadien-3-yl acetoacetate

A two liter flask was charged with 336.5 gms. of 3,7-dimethyl-1,6-nonadien-3-ol, 380 cc. pentane, 4 cc. pyridine and 4 cc. of acetic acid. 185 gms. of diketene were placed in a dropping funnel. One third of the diketene was added to the other reactants. The temperature was maintained at 20–30° C. After one hour the remainder of the diketene was added over a period of 2½ hours at 20–30° C. The reaction mixture was stored in the refrigerator overnight. It was then washed with cold water, dried over $Na_2SO_4$, filtered and concentrated in vacuo. The temperature was not allowed to exceed 50° C. The residue consisted of 504 gms. of 3,7-dimethyl-1,6-nonadien-3-yl acetoacetate ($n_D^{25}=1.4627$).

Example 5.—Preparation of 3,7-dimethyl-6,7-epoxy-1-nonen-3-yl acetoacetate

To 3,7-dimethyl-1,6-nonadien-3-yl acetoacetate (504.7 gms.) 2.8 liters of toluene, and 86.4 gms. of anhydrous sodium acetate was added 570.3 gms. of acetic acid solution containing 40 percent by weight peracetic acid. This addition was made during two hours at 20–25° C. After stirring 3.5 hours at 20–25° C., the reaction mixture was poured into 3 l. of cold water. The toluene layer was separated and washed with water, saturated sodium bicarbonate solution, 2% sodium thiosulfate solution and water. After drying over sodium sulfate and filtering, the toluene solution was concentrated in vacuo to give 501.7 gms. of 3,7-dimethyl-6,7-epoxy-1-nonen-3-yl acetoacetate as a mixture of geometric stereo-isomers ($n_D^{25}=1.4632$).

Example 6.—Preparation of 6,10-dimethyl-9,10-epoxy-dodeca-5-en-2-one

A one liter flask was fitted with a stirrer, thermometer, dropping funnel and a condenser with a tube at the top leading to a Dry Ice trap and gas meter. The dropping funnel was filled with 400 gms. of 3,7-dimethyl-6,7-epoxy-1-nonen-3-yl acetoacetate. To the flask was added 6 gms. of aluminum isopropoxide and one quarter of the contents of the dropping funnel. The reaction mixture was heated, and when the temperature reached 130° C., the gas meter was connected. At 170–180° C. evolution of carbon dioxide was vigorous. When gas evolution began to subside, the remaining contents of the dropping funnel were added at such a rate as to maintain vigorous gas evolution at 180–190° C. Heating was continued until gas evolution ceased. 35.1 liters of carbon dioxide was evolved. The reaction mixture was then distilled through an 18 inch column packed with saddles at a 4 to 1 reflux ratio to obtain 6,10-dimethyl-9,10-epoxydodeca-5-en-2-one as a mixture of geometric stereoisomers.

The 6,10-dimethyl-9,10-epoxydodeca-5-en-2-one had a very soft, sweet floral note with a brier rose character.

Example 7.—Preparation of ethyl-3,7,11-trimethyl-10,11-epoxy-2,6-tridecadienoate To a suspension of sodium hydride 56.7% dispersion in mineral oil (3.39 gms.) in 120 cc. of diethyl ether was added diethyl carbethoxymethyl phosphonate (18.8 gms.) during 25 minutes at 20–25° C. When hydrogen evolution ceased, 6,10-dimethyl-9,10-epoxydodeca-5-en-2-one (17.9 gms.) in 20 cc. of diethyl ether was added during 30 minutes at 20–30° C. After stirring 2 hours at 20–30° C., the reaction mixture was partitioned between water and ether. The ether layer was washed with water, dried over sodium sulfate, filtered and concentrated in vacuo. The residue was distilled through a Vigreaux column giving ethyl-3,7,11-trimethyl-10,11-epoxy-2,6-tridecadienoate as a mixture of geometric stereo-isomers ($n_D^{25}=1.4753$).

Example 8

3,7-dimethyl-1,6-octadien-3-yl - acetoacetate was prepared from the reaction product of 3-methyl-1-buten-3-ol and ethyl acetoacetate by the procedure given in Examples 1–4.

Example 9.—Preparation of 3,7-dimethyl-6,7-epoxy-1-octen-3-yl acetoacetate using perphthalic acid Commercial sodium perborate (527 gms.) was suspended in 2.5 liters of cold water. Phthalic anhydride (535 gms.) was added at 0° C. After stirring 3 hours at 0° C., 30% sulfuric acid was added at 0° C. until the reaction mixture was acid to congo. 3,7-dimethyl-1,6-octadien-3-yl acetoacetate (468 gms.) in 1 liter of toluene was added, and the reaction mixture was allowed to warm to room temperature. After one hour the reaction mixture was poured into 3.5 liters of saturated sodium bicarbonate solution. The toluene layer was separated and washed with saturated sodium bicarbonate solution, 2% sodium thiosulfate solution and water. After drying over sodium sulfate and filtering, the toluene solution was concentrated in vacuo to give 400.9 gms. of 3,7-dimethyl-6,7-epoxy-1-octen-3-yl acetoacetate as a mixture of geometric stereo-isomers ($n_D^{25}=1.4609$).

Example 10.—Preparation of 3,7-dimethyl-6,7-epoxy-1-octen-3-yl acetoacetate using peracetic acid To 3,7-dimethyl-1,6-octadien-3-yl acetoacetate (596 gms.), anhydrous sodium acetate (108 gms.) and toluene (3.5 liters) was added 40% peracetic acid (712 gms.) during 3 hours at 20–25° C. After stirring 3.5 hours at 20–25° C., the reaction mixture was poured into 3 liters of cold water. The toluene layer was separated and washed with water, saturated sodium bicarbonate solution, 2% sodium thiosulfate and water. After drying over sodium sulfate and filtering, the toluene solution was concentrated in vacuo to give 513 gms. of 3,7-dimethyl-6,7-epoxy-1-octen-3-yl acetoacetate as a mixture of geometric stereo-isomers ($n_D^{25}=1.4606$).

Example 11.—Preparation of 6,10-dimethyl-9,10-epoxy-undeca-5-en-2-one

A one liter flask was fitted with a stirrer, thermometer, dropping funnel and a condenser with a tube at the top leading to a Dry Ice trap and gas meter. The dropping funnel was filled with 400 gms. of 3,7-dimethyl-6,7-epoxy-1-octen-3-yl acetoacetate. To the flask was added 6 gms. of aluminum isopropoxide and one quarter of the contents of the dropping funnel. The reaction mixture was heated and when the temperature reached 130° C., the gas meter was connected. At 180–190° C. evolution of carbon dioxide was vigorous. When gas evolution began to subside, the remaining contents of the dropping funnel were added at such a rate as to maintain vigorous gas evolution at 180–190° C. Heating was continued until gas evolution ceased. 35.1 liters of carbon dioxide was evolved. The reaction mixture was then distilled through an 18 inch column of saddles at a 4 to 1 reflux ratio. 199 gms. of 6,10-dimethyl-9,10-epoxyundeca-5-en-2-one was collected. The product was a mixture of geometric stereo-isomers ($n_D^{25}=1.46$).

The 6,10-dimethyl-9,10-epoxyundeca-5-en-2-one had a soft, sweet floral note with a rose nuance.

Example 12.—Preparation of methyl-3,7,11-trimethyl-10,11-epoxy-2,6-dodecadienoate To a suspension of sodium hydride 56.7% dispersion in mineral oil (8.5 gms.) in 750 cc. of dimethylformamide was added dimethyl carbomethoxymethyl phosphonate (38.2 gms.) during one hour at 20–30° C. When hydrogen evolution ceased, 6,10-dimethyl-9,10-epoxyundeca-5-en-2-one (42.0 gms.) was added during 45 minutes at 20–30° C. After stirring four hours at 20–30° C., the reaction mixture was poured into cold water and extracted two times with hexane. The hexane extracts were washed with water, dried over sodium sulfate, filtered and concentrated in vacuo. The residue was distilled through a Vigreaux column to give 29.9 gms. of methyl-3,7,11-trimethyl-10,11-epoxy-2,6-dodecadienoate as a mixture of geometric stereo-isomers ($n_D^{25}=1.4774$).

Example 13.—Preparation of ethyl-3,7,11-trimethyl-10,11-epoxy-2,6-dodecadienoate To a suspension of sodium hydride 60% dispersion in mineral oil (12 gms.) in 600 cc. of diethyl ether was added diethyl carbethoxymethyl phosphonate (67.3 gms.) during 1.5 hours at 20–25° C. When hydrogen evolution ceased, 6,10-dimethyl-9,10-epoxyundeca-5-en-2-one (62.1 gms.) was added during 30 minutes at 20–30° C. After stirring overnight, the reaction mixture was partitioned between water and ether. The ether layer was washed with water, dried over sodium sulfate, filtered and concentrated in vacuo. The residue was distilled through a Vigreaux column giving 67.7 gms. of ethyl-3,7,11-trimethyl-10,11-epoxy-2,6-dodecadienoate as a mixture of geometric stereo-isomers ($n_D^{25}=1.4744$).

Example 14

3 - ethyl-7-methyl-6,7-epoxy-1-nonen-3-yl acetoacetate was prepared from the reaction product of 3-methyl-1-penten-3-ol and the ethyl ester of 3-oxo-pentanoic acid by the procedure of Examples 1 through 5.

Example 15

3 - ethyl-7-methyl-6,7-epoxy-1-nonen-3-yl acetoacetate was converted to 6-ethyl-10-methyl-9,10-epoxy dodeca-5-en-2-one by the process of Example 11 which was then converted to 10,11-epoxy-3,11-dimethyl-7-ethyl-2,6-tridecadienoic acid methyl ester by the procedure of Example 12.

We claim:.

1. A process for preparing an epoxy compound of the formula:

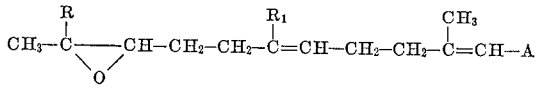

wherein R and $R_1$ are lower alkyl; A is selected from the group consisting of

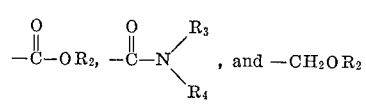
, and $-CH_2OR_2$ $R_2$ is selected from the group consisting of hydrogen, lower alkyl, phenyl and dilower alkyl amino lower alkyl; and $R_3$ and $R_4$ are lower alkyl and taken together with the nitrogen atom a mono heterocyclic ring selected from the group consisting of 5-membered rings and 6-membered rings and containing at the most, one further hetero atom selected from the group consisting of nitrogen, oxygen and sulfur;

from an acetoacetate of the formula:

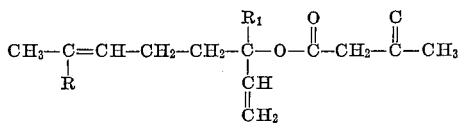

wherein R and R₁ are as above;

comprising the following steps:
(a) treating said acetoacetate compound with an epoxidizing agent to form an epoxy acetoacetate compound of the formula:

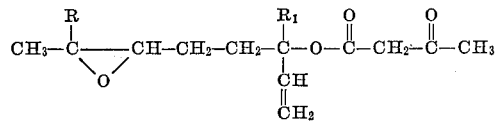

wherein R and R₁ are as above;
(b) heating said epoxy acetoacetate compound to a temperature of 120° C. to about 220° C. to form a keto compound of the formula:

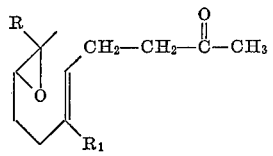

wherein R and R₁ are as above;
(c) reacting said keto compound with a compound of the formula:

$$X^-(R'R''R''')P-CH_2-A$$

wherein A is as above; and R', R", and R''' are selected from the group consisting of aryl containing from 6 to 20 carbon atoms, aralkyl containing from 7 to 20 carbon atoms, and alkyl containing from 1 to 20 carbon atoms; and X is an anion of a mineral acid.

2. A process for preparing an epoxy compound of the formula:

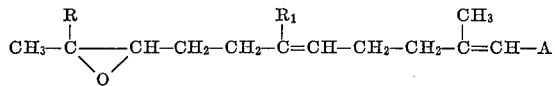

wherein R and R₁ are lower alkyl; A is selected from the group consisting of

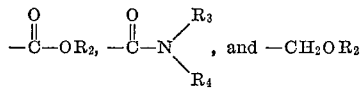

R₂ is selected from the group consisting of hydrogen, lower alkyl, phenyl and dilower alkyl amino lower alkyl; and R₃ and R₄ are lower alkyl and taken together with the nitrogen atom a mono heterocyclic ring selected from the group consisting of 5-membered rings and 6-membered rings and containing at the most, one further hetero atom selected from the group consisting of nitrogen, oxygen and sulfur;

from an acetoacetate of the formula:

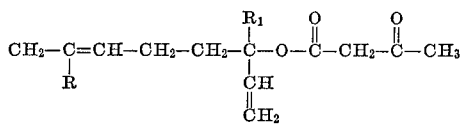

wherein R and R₁ are as above;

comprising the following steps:
(a) treating said acetoacetate compound with an epoxidizing agent to form an epoxy acetoacetate compound of the formula:

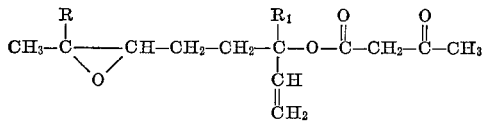

wherein R and R₁ are as above;
(b) heating said epoxy acetoacetate compound to a temperature of 120° C. to about 220° C. to form a keto compound of the formula:

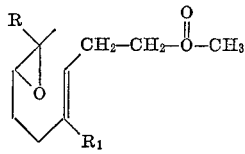

wherein R and R₁ are as above; and
(c) treating said keto compound with a phosphonate of the formula:

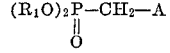

wherein R₁ and A are as above.

References Cited
FOREIGN PATENTS
1,138,037  10/1962  Germany.

OTHER REFERENCES
Dahm, K. H. et al.: Jour. Amer. Chem. Soc. 89 (20) Sept. 27, 1967, pp. 5292–4.
Kimel, W., et al.: Jour. Am. Chem. Soc., vol. 65, No. 10, October 1943, pp. 1992–8.

NORMA S. MILESTONE, Primary Examiner

U.S. Cl. X.R.
260—268, 294.7, 306.7, 326.5, 348, 483, 632, 999

PO-1050
(5/69)

UNITED STATES PATENT OFFICE
CERTIFICATE OF CORRECTION

Patent No. 3,573,299      Dated March 30, 1971

Inventor(s) Andrews, Kimel and Propper

It is certified that error appears in the above-identified patent and that said Letters Patent are hereby corrected as shown below:

Column 11, line 5, Claim 1

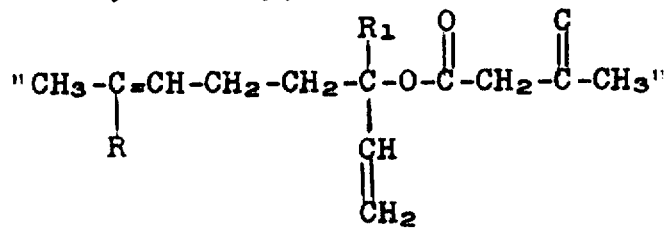

should be

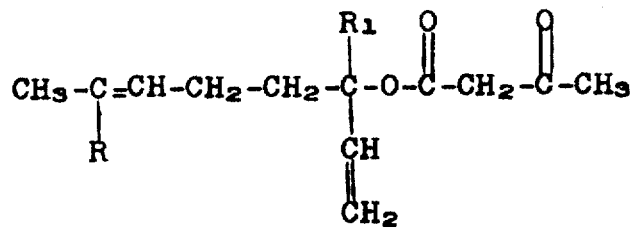

Column 11, line 31, Claim 1

"are as above;"

should be are as above; and

PO-1050
(5/69)

UNITED STATES PATENT OFFICE
CERTIFICATE OF CORRECTION

Patent No. 3,573,299      Dated _____

Inventor(s) _____ PAGE - 2

It is certified that error appears in the above-identified patent and that said Letters Patent are hereby corrected as shown below:

Column 12, line 8, claim 2

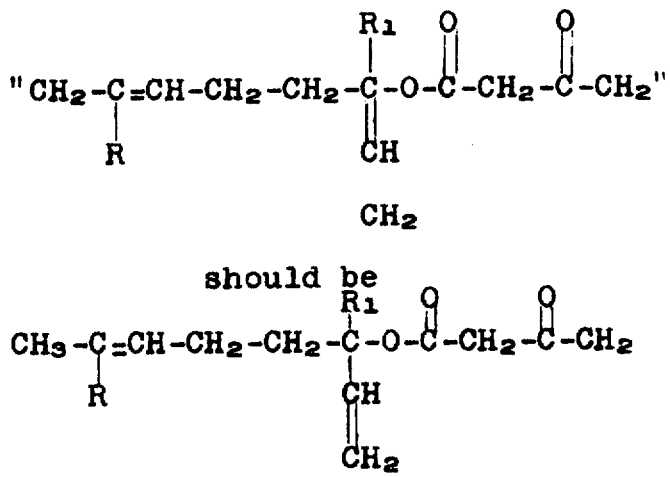

Signed and sealed this 2nd day of November 1971.

(SEAL)
Attest:

EDWARD M. FLETCHER, JR.
Attesting Officer

ROBERT GOTTSCHALK
Acting Commissioner of Pat